United States Patent [19]
Andre

[11] Patent Number: 5,316,606
[45] Date of Patent: May 31, 1994

[54] METHOD OF FABRICATING A METAL PIPE WITH AN INTEGRALLY FORMED LINER

[75] Inventor: James R. Andre, Newport Beach, Calif.

[73] Assignee: W. E. Hall Company, Newport Beach, Calif.

[21] Appl. No.: 736,108

[22] Filed: Jul. 26, 1991

[51] Int. Cl.$^5$ .................. B29C 47/02; B32B 31/30
[52] U.S. Cl. .................................. 156/201; 156/210; 156/244.11; 156/309.9
[58] Field of Search ............... 138/129, 134, 135, 137, 138/141, 144, 147, 150, 152, 154; 156/195, 322, 320, 210, 201, 244.11, 244.27, 302, 309.9

[56] References Cited
U.S. PATENT DOCUMENTS

| | | | |
|---|---|---|---|
| 3,402,086 | 9/1968 | Smith et al. | 156/244.11 |
| 3,721,597 | 3/1973 | Colburn | 156/322 |
| 3,868,433 | 2/1975 | Bartz et al. | 156/334 |
| 4,472,475 | 9/1984 | Decroix | 156/244.11 |
| 4,838,317 | 6/1989 | Andre et al. | 138/135 |

FOREIGN PATENT DOCUMENTS 63-154331  6/1988  Japan .

OTHER PUBLICATIONS

"Adhesives Age", vol. 28, No. 2, Feb. 1985, Adhesive Polymers, pp. 6 and 8.
"Modern Plastics Encyclopedia", vol. 67, No. 11, Oct. 1990, pp. 70 and 823.

Primary Examiner—Michael W. Ball
Assistant Examiner—Richard Crispino
Attorney, Agent, or Firm—Stetina and Brunda

[57] ABSTRACT

A metal pipe and method of forming the same with an integrally formed liner for use in corrosive and abrasive environments is disclosed. The liner is comprised of a relatively thick high density polyethylene which is thermally bonded to the metal pipe. An intermediate co-extruded polymer layer of ethylene acrylic acid and a polyethylene/ethylene acrylic acid blend is applied to the metal pipe facilitate thermal bonding. The intermediate layer is applied to the sheet metal in a pre-treatment process prior to roll forming ribs into the sheet metal. The polyethylene liner is applied after the ribs are formed To provide a smooth, hydraulically efficient surface which is resistent to the corrosive action of sulfuric acid and the like encountered in sanitary applications, as well as abrasion caused by the flow of waterborn debris such as dirt and gravel as is encountered in culvert applications. Various means for further securing the polyethylene layer to the metal pipe surface are disclosed.

16 Claims, 5 Drawing Sheets

METHOD OF FABRICATING A METAL PIPE WITH AN INTEGRALLY FORMED LINER

FIELD OF THE INVENTION

The present invention relates generally to buried pipe for use in sewers, storm drains, pen stocks, culverts, and other low head applications, and more particularly to metal pipe with an integrally formed liner for use in corrosive and abrasive environments and a method of fabricating the same.

BACKGROUND OF THE INVENTION

Metal pipe of both corrugated and spiral rib design is widely used for drainage, culverts and other similar fluid conduits. Although susceptible to abrasion, steel pipe is preferred over concrete pipe and the like due to its comparatively high strength and low weight. These characteristics render metal pipe relatively inexpensive to manufacture, ship and handle while permitting its use in applications requiring it to support substantial soil overburden. Further, in recent years a particular spiral ribbed steel pipe has been introduced by W. E. Hall Co., of Newport Beach, Calif., the assignee of the subject application, that possesses hydraulic efficiency comparable to more costly concrete pipe as well as possesses superior structural capabilities for prolonged use in buried storm drain applications.

Since metal pipe is susceptible to corrosion, its use has heretofore been restricted primarily to culvert and storm drain applications. In sanitary applications, i.e. sewer systems, corrosion causing sulfuric acid is formed from hydrogen sulfide generated by waste products. Such waste products and/or acid renders the use of steel pipe in sanitary applications impractical since it rapidly deteriorates in the corrosive environment. As such, much heavier and more expensive concrete, lined concrete and/or vitreous clay pipe has traditionally been utilized for sanitary applications. Thus, although metal pipe is generally preferred because of its high strength and relatively low weight and cost, metal pipe has heretofore not been widely used in sanitary applications due to its susceptibility to corrosion.

In recognition of these deficiencies, prior art attempts to allow the use of concrete pipe as opposed to vitreous clay pipe for large size sewer applications while reducing the susceptibility to corrosion of concrete pipe have included: the installation of a thick corrosive-resistant plastic liner, and/or forming the inside of a concrete pipe with additional sacrificial concrete in the crown portion of the pipe.

Such prior art corrosion-resistant liners typically comprise plastic inserts sized to be received within each concrete pipe section. Such liners are commonly cast within each pipe section. Subsequently after the pipe sections have been laid in place, adjacent liners are bonded together with the intention of forming a seal to prevent corrosive fluids and gases from contacting the concrete pipe. Although such prior art concrete pipe/plastic liner solutions have proven generally suitable for large size sewer applications, the inherent high cost of such solutions has posed a severe impediment in construction products. Further the useful life of such prior art sacrificial concrete pipe solutions is finite, which requires widespread rehabilitation over time thereby mandating tremendous expense in down line rehabilitation costs.

In recognition of the general inability of metal pipe and concrete pipe for sewer applications, in recent years plastic pipe has been introduced into the marketplace. Although such plastic pipe withstands degradation caused by the corrosive environment found in sewer applications, its use has heretofore been primarily limited to small size sewer applications. In this regard, the structural integrity of plastic pipe is extremely limited such that in large size applications, the sidewall of such plastic pipe must be fabricated extremely thick or profiled to enable such plastic pipe to withstand compressive forces exerted in burial applications. Due to the high cost of such plastic material, the use of such plastic pipe in large scale sewer applications has been economically unfeasible. Therefore, in view of the specific factors encountered in large scale sanitary sewer applications, nearly all such applications have utilized costly concrete pipe having a sacrificial wall formed therein which significantly decay over prolonged use and thus will require costly rehabilitation and/or replacement over time.

In contrast to the waste product and/or acid environment encountered in sanitary applications, metal pipe utilized for burial storm drain applications additionally encounters substantial problems associated with its operational environment. In relation to burial storm drain applications, wherein metal pipe is the primary material candidate, long term exposure of the exterior of the metal pipe within the burial environment serves to corrode the exterior of the pipe while water and debris flowing through the interior of the metal pipe degrades the pipe through abrasion.

In an effort to prevent such corrosion effects, the interior of metal pipe has been lined with concrete in the hopes that a thicker lining would be more abrasion resistant and thereby resist deterioration and corrosion. However, there fails to exist any fail-safe means for anchoring concrete to the interior wall of metal pipe. Consequently, pieces of the concrete lining inevitably become detached from the pipe. When combined with the continual abrading action occurring therein, this quickly destroys the protective concrete layer. Additionally, concrete is susceptible to cracking and chipping as a result of mishandling, earth movement, and thermal stress. Such cracking and chipping results in corrosion of the steel surface in the vicinity of the chip or crack.

An alternative prior art approach to solving the corrosion and abrasion deficiencies of metal pipe for storm drain applications has been to fabricate the metal pipe from plastic laminated steel sheet material. One such prior art product is known as Black-Klad TM, a product of Inland Steel Company of Chicago, Ill. Prior to rolling the steel sheet into a pipe section, one surface, i.e. that surface which forms the inner pipe surface, is laminated with a polymer material such as a polyethylene compound. The thickness of such lamination is limited to approximately 0.010 inch and is intended to resist degradation caused by corrosion and abrasion. However due to the comparatively thin thickness layer of plastic laminant, the laminant tends to wear through due to abrasion from sand, rocks, etc. and thereby expose the metal surface below. Further, during the pipe formation process, the thin laminant oftentimes is damaged due to metal cold roll forming procedures.

Attempts to apply thicker laminations to such prior art products have heretofore resulted in greater blistering and separation of the polymer compound from the metal pipe particularly when the pipe is exposed to flow applications. As such, the application of a protective polymer layer to metal pipe has heretofore been rendered ineffective.

Therefore because the prior art interior lining of metal pipes have proven susceptible to abrasion and corrosion, and since abrasion resistant inert linings such as those constructed of concrete or an inert polymer material have failed to remain effectively anchored to the metal pipe walls, metal pipe has heretofore been unacceptable for use in sanitary applications such as sewer drains.

As such, there exists a substantial need in the art for a sufficiently thick coating or lining which may be securely applied to metal surfaces to maintain the integrity thereof when the metal pipe is placed in a corrosive environment and to remain thereon without blistering during the pipe formation process. Further, there exists a substantial need in the art for an improved metal pipe with an inert protective lining constructed of a polymer material such as polyethylene which would resist the attack of sulfuric acid as well as resist other forms of corrosion encountered in sewer application.

SUMMARY OF THE INVENTION

The present invention specifically addresses and alleviates the above referenced deficiencies associated in the prior art. More particularly, the present invention comprises a metal pipe with an integrally formed liner for use in corrosive and abrasive environments. In the preferred embodiment of the present invention, the liner is comprised of 0.050 to 0.125 inch thick high density polyethylene which is securely bonded to the metal pipe during fabrication of the metal pipe. However, other polymers having corrosion resistant properties similar to polyethylene are likewise contemplated herein.

The liner is formed by applying a thin co-extruded film of ethylene acrylic acid and a polyethylene/ethylene acrylic acid blend to the metal pipe surface and subsequently extruding a comparatively thick layer of high density polyethylene thereover. The co-extruded film is applied in a pre-treatment process to the sheet metal, prior to roll forming corrugations or ribs in the sheet steel. The final relatively thick high density polyethylene layer is applied after the corrugations or ribs are formed in the sheet metal and either prior to or subsequent to helically winding and forming the sheet steel into pipe sections. The co-extruded film is specifically formed to securely adhere to the surface of the sheet metal and provide an upper film or layer suitable for subsequent thermal bonding of a relatively thick layer of high density polyethylene. As such, the co-extruded film serves as a strong adhesive which chemically bonds to the metal pipe and additionally forms a polyethylene base material suitable to enable the subsequent application of a relatively thick layer of high density polyethylene thereto. As such, present invention provides a smooth, hydraulically efficient interior surface which is resistent to the corrosive action of sulfuric acid and the like as is typically encountered in sanitary applications. It is also highly resistant to abrasion caused by the flow of water-born debris such as dirt and gravel as is encountered in culvert applications.

The process of forming the metal pipe of the present invention commences with the steps of prewashing the sheet metal to remove any residual oil and dirt. The sheet metal is subsequently bathed in an alkaline solution to remove chromates and then rinsed. The alkaline bath and rinse are preferably repeated and the sheet metal is then etched with an etchant and then dried. Optionally, a primer coat of an adhesive may be then applied and the sheet metal is heated to cure for particular applications. Preferably, a co-extruded polymer layer of ethylene acrylic acid and polyethylene/ethylene acrylic acid blend is subsequently applied over the metal or if used the primer coat to which it adheres. Subsequently, the pre-treated metal sheet is cooled and coiled and then formed by conventional techniques to include corrugations or ribs.

Subsequently, the pre-treated and corrugated sheet metal is heated and a molten layer of polymer such as high density polyethylene is extruded unto the pre-treated sheet metal typically having a thickness of approximately 0.050 to 0.125 of an inch. Due to the polyethylene being applied at an elevated plasticized temperature, it securely thermally bonds to the co-extruded film layer previously applied to the sheet metal to provide a composite corrosion and abrasive resistant pipe. In the preferred embodiment, the application of the relatively thick, high density polyethylene layer may be applied prior to forming the corrugated sheet metal into pipe lengths or alternatively just subsequent to forming into pipe lengths. Subsequently, the pipe sections are cooled and cut into desired lengths using conventional techniques. Although disclosed in relation to specific application to pipe forming applications, the present invention is additionally applicable to other metal forming applications wherein chemical resistance of the fabricated metal product is required.

In addition to being thermally bonded to the co-extruded film layer, the relatively thick, high density polyethylene layer may be further secured to the sheet metal via the use of anchors captured within the tapered channels of the pipe and attached to the high density polyethylene layer.

Various means for attaching the anchor to the high density polyethylene layer are contemplated. The high density polyethylene layer may be forced along with the anchor into the tapered channel such that the high density polyethylene layer substantially surrounds the anchor and is captured within the tapered channel. The anchor is preferably comprised of a compressible polymer material such that it may be forced through the narrow opening of a tapered channel and then expand such that it remains captured therein. Optionally, the anchor may comprise a hollow center extending substantially the entire length thereof to facilitate such compression. Alternatively, the anchor may comprise a high density polyethylene core substantially surrounded by a low linear density Polyethylene covering.

Alternatively, the anchor may first be disposed within the tapered channel and then the high density polyethylene layer applied to the co-extruded film layer as previously described. The anchor is then bonded or welded to the high density polyethylene layer. Those skilled in the art will recognize that various means, i.e. thermal bonding and/or the use of chemical adhesives or bonding agents, are suitable for attaching the anchor to the high density polyethylene layer.

Alternatively, a layer of polyethylene may be attached to the anchor prior to the insertion of the anchor into the tapered channel such that a portion of the polyethylene layer extends outward through the opening in the tapered channel whereby it may be thermally or adhesively bonded to the high density polyethylene layer.

Alternatively, the anchor may be formed to have an integral portion which extends through the opening of the tapered channel and to which the high density polyethylene layer may be thermally or adhesively bonded.

Alternatively, the anchor may be disposed within the channel prior to forming the tapered sides of the channel wherein a narrowed opening is formed. The use of a non-compressible anchor material is thus facilitated and the likelihood of the anchor being undesirably pulled through the opening of the tapered channel is mitigated.

Alternatively, a non-tapered or rectangular channel may be provided and a complementary shaped anchor disposed therein prior to the application of the relatively thick, high density polyethylene layer. The rectangular anchor may be wound into the channel in such a manner that it resists removal from the channel. For example, a substantially straight anchor material may be bent during the insulation process such that the tendency of the material to straighten forces it outward and thus deeper into the channel, thereby maintaining its position therein.

Thus, various methods are provided whereby the relatively thick, high density polyethylene layer may be securely attached to the inner walls of sheet metal pipe to prevent delamination or blistering of the relatively thick, high density polyethylene layer. The use of anchors as discussed above thus further increases the life and reliability of the metal pipe with integrally formed liner of the present invention and also expands the potential applications of such pipe by reducing the pipe's susceptibility to harsh environments such as those encountered in sewer and culvert applications.

These, as well as other advantages of the present invention will be more apparent from the following description and drawings. It is understood that changes in the specific structure shown and described may be made within the scope of the claims without departing from the spirit of the invention.

BRIEF DESCRIPTION OF THE DRAWINGS

FIG. 11b is a cross sectional side view of a tapered channel having an anchor comprised of a high density polyethylene core and low linear density polyethylene covering disposed therein wherein the relatively thick, high density polyethylene layer has been forced therein as in FIG. 11a;

FIG. 11c is a cross sectional side view of a tapered channel having a hollow anchor disposed therein wherein the relatively thick, high density polyethylene layer has been forced therein as in 11a;

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be instructed or utilized. The description sets forth the functions and sequence of steps for constructing and utilizing the invention in connection with the illustrated embodiments. It is to be understood, however, that the same or equivalent functions and sequences may be accomplished by different embodiments that are also intended to be encompassed within the spirit and scope of the invention.

Although not by way of limitation, the process and apparatus of the present invention is well suited for use on helical spiral ribbed metal pipe such as that disclosed in U.S. Pat. No. 4,838,317 issued to Andre et al. and assigned to the subject assignee W. E. Hall Co. In this regard, the process and apparatus of the present invention shall be described in relation to the fabrication of such helical spiral ribbed metal pipe. However, those skilled in the art will recognize that the teachings of this invention are applicable to other metal pipe structures as well as other metal sheet products desired to withstand corrosive environments.

Figure 1:
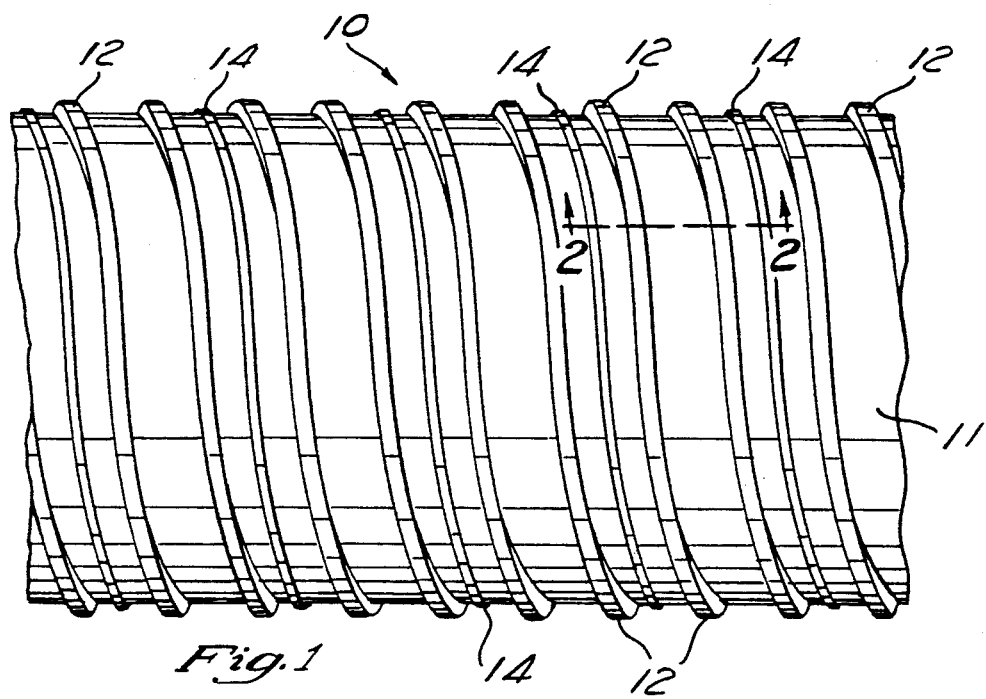
FIG. 1 is a perspective view of the exterior of a length of pipe constructed in accordance to the present invention.
Figure 2:
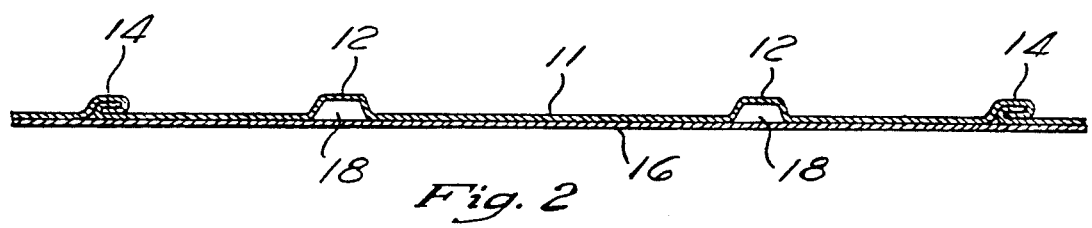
FIG. 2 is an enlarged cross-sectional view of the pipe wall of FIG. 1 taken about lines 2—2 of FIG. 1.

Referring now to FIGS. 1 and 2, the improved pipe of the present invention is depicted generally comprised of a metal, preferably steel, spiral ribbed pipe 10 having externally extending ribs 12 formed thereon, lock seams 14, and an integrally formed polyethylene liner 16. Voids 18 are preferably formed between the liner 16 and the sheet steel of which the pipe 10 is formed as will be explained in more detail infra.

Figure 3:
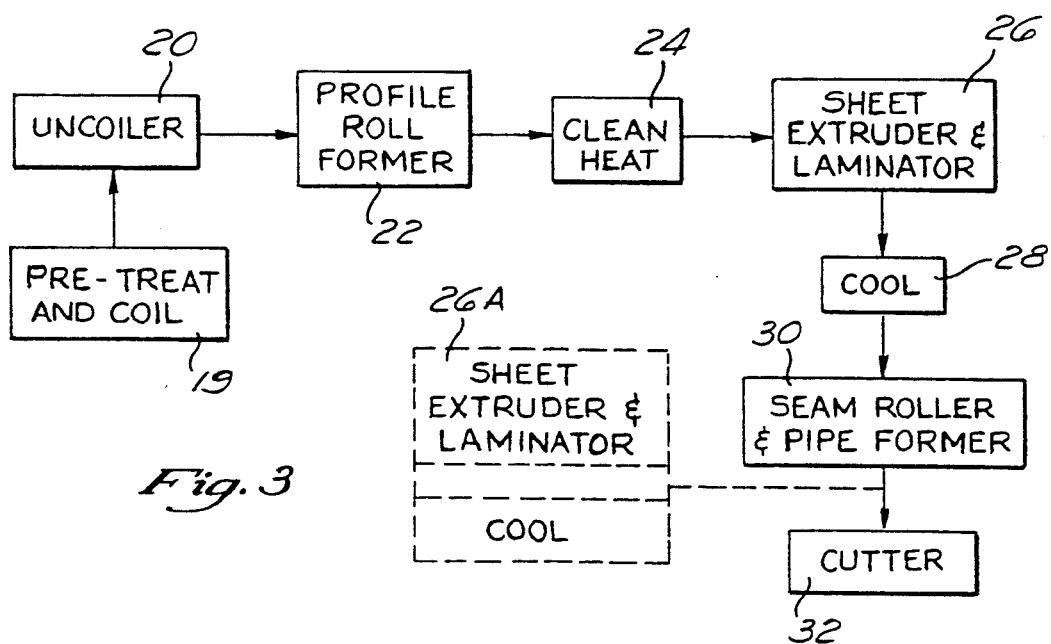
FIG. 3 is a flow diagram of the method of forming metal pipe with an integral liner of the present invention.
Figure 4:
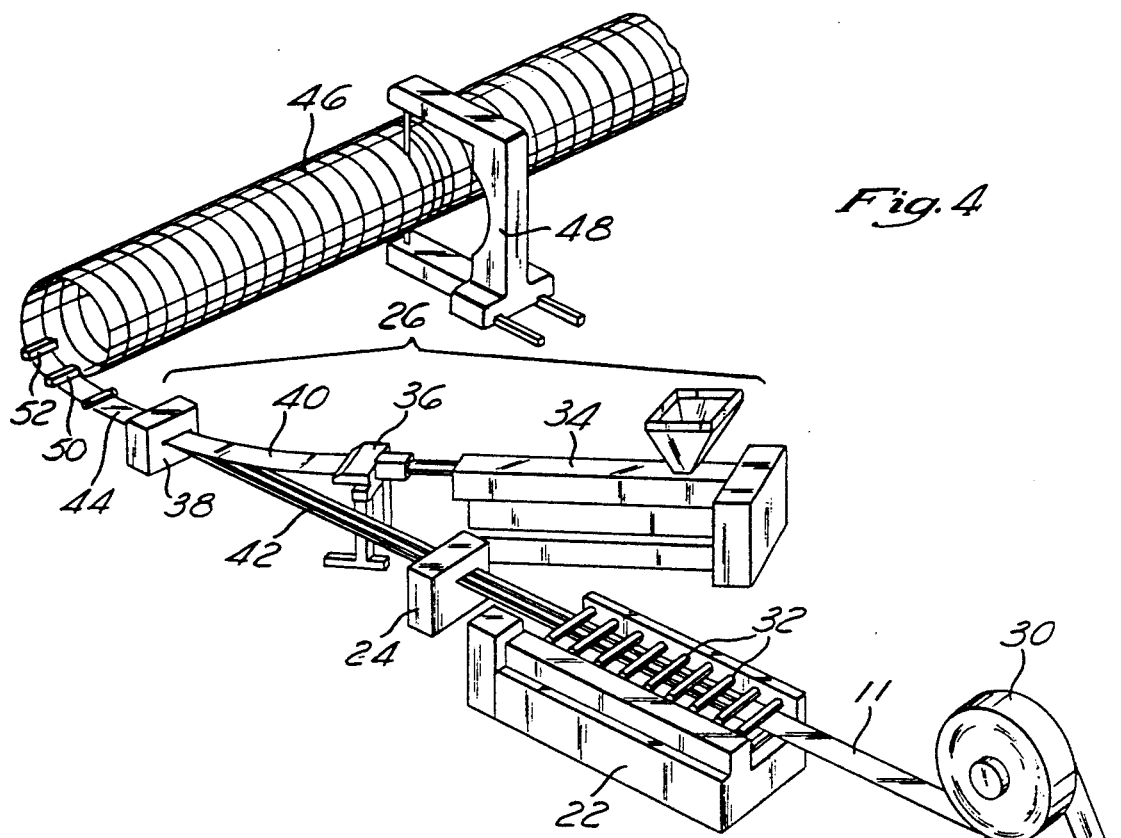
FIG. 4 is a perspective view of the apparatus for forming the metal pipe with an integrally formed liner of the present invention.

Referring now to FIG. 3, an overview of the process of forming the metal pipe 10 with an integrally formed liner 16 of the present invention is provided. The process generally comprises pre-treating sheet metal such as steel to have a thin co-extruded polymer layer formed thereon and coiling the same for further fabrication. The pre-treated sheet metal 11 is then uncoiled via an uncoiler 20, and ribs and/or corrugations and seams 14 (as shown in FIGS. 1 and 2) are formed thereon with a profile roll former 22 (as shown in FIG. 4). Subsequently the pretreated and preformed sheet metal 11 may be cleaned and heated 24. A sheet extruder and laminator 26 provides hot extrudate polymer preferably high density polyethylene to the upper surface of the sheet metal. The laminator presses the hot extrudate into contact with the upper pre-treated surface of the sheet metal, thermally bonding it to the co-extruded film layer. The pipe and liner are then cooled 28 prior to being received by the roller and pipe former 30 which forms the flat sheet metal into a helical pipe section and crimps the seams 14 together to form a watertight seal. A cutter 32 then outs sections of pipe to a desired length.

The steps of forming the ribs 12 and seams 14 with the profile roll former 22 and of forming the flat sheet metal into a helical pipe section with pipe former 30 are thoroughly disclosed in U.S. Pat. No. 4,838,317, issued to Andre, et al., the disclosure of which is expressly incorporated herein by reference. However, other conventional metal pipe fabrication techniques as well as other fabricated metal products are contemplated herein.

As best shown in FIGS. 1 and 2, the metal pipe 10 having an integrally formed liner 6 of the present invention includes a channeled wall defining a plurality of outwardly projecting structural ribs 12 and a hydraulically efficient interior surface. The ribs 12 are preferably formed in a helical configuration and the channels 14 which are formed interiorly thereof are generally formed having either a square or generally rectangular cross section and are open along the interior surface of the pipe.

Figure 9:
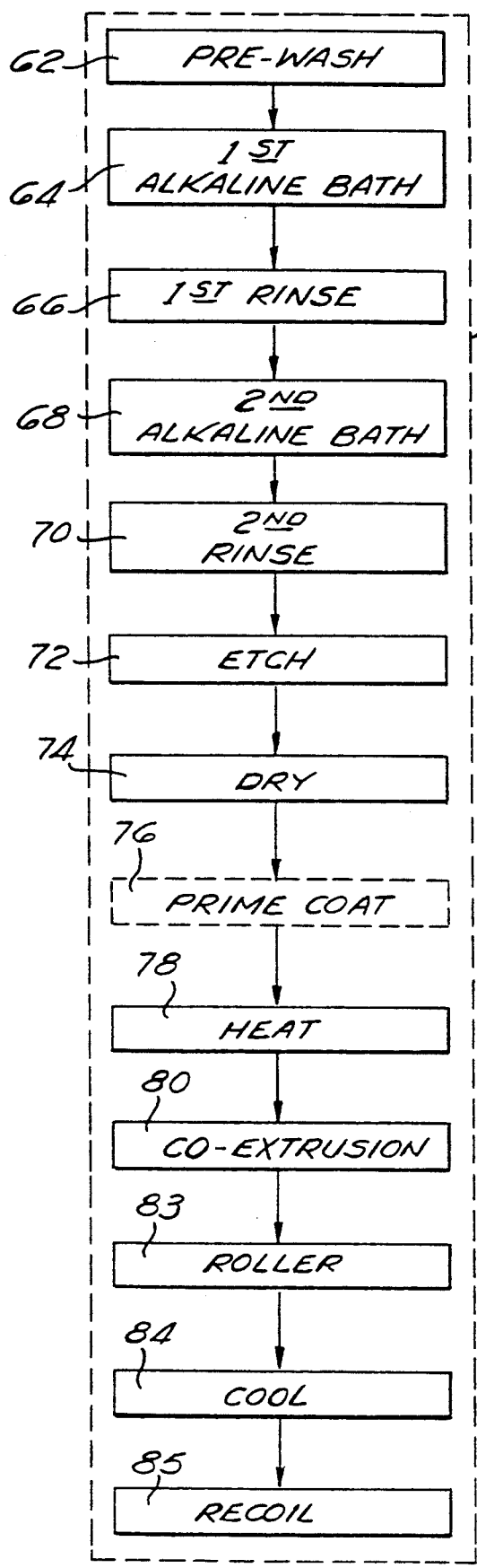
FIG. 9 is a flow chart of the pre-treatment, pre-coating process for bonding the co-extruded film layer to the sheet metal.

Referring now to FIG. 9, the detailed steps of the pre-treatment process 19 utilized prior to forming the sheet metal 11 into pipe sections 10 is described. Those skilled in the art will recognize that the sheet metal is fabricated in elongate lengths that are coiled for ease in subsequent forming processes.

The initial pre-treatment process 19 is initiated by a pre-wash 62 being performed on the sheet metal typically galvanized sheet steel to remove any residual oil and/or dirt from the upper and preferably lower surface of the sheet metal 11. This step may consist of processes well known in the art such as the application of a detergent, scrubbing with roller brushes, and rinsing with water.

The sheet metal 11 is then subjected to an alkaline bath 64 to loosen and remove chromates formed upon the surface thereof. The alkaline bath 64 is followed by a rinse 66 which may be comprised of a buffer or neutralizing acid. The alkaline bath 64 and rinse 66 are preferably repeated 68 and 70 to ensure adequate removal of chromates. After the alkaline baths 64 and 68 and the rinses 66 and 70, the sheet metal is subsequently subjected to an etchant such as a Parker Bonderite 1303 enchant to roughen its surface and prepare it for the application of a prime coat or layer. Next the sheet steel is dried 74 and a prime coat 76 may be applied thereto. The prime coat preferably comprises a thin layer (approximately 1 to 2 mils.) of ethylene aorylio acid which is applied to the etched surface of the sheet metal 11. Optionally, after application, a primer coat 76 such as an adhesive may be applied and cured with heat to securely bond the primer coat 76 to the etched surface of the sheet metal 11. In most instances however, the primer coat 76 may be eliminated as indicated in phantom lines in FIG. 9.

Figure 10:
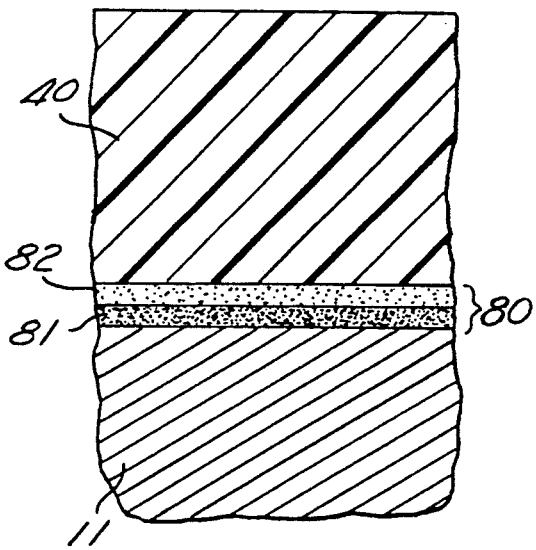
FIG. 10 is an enlarged cross-sectional view of a portion of the liner and steel pipe showing the resultant co-extruded film layer and high density polyethylene layer liner formed on the interior of the pipe layer.

Subsequently, the etched sheet metal 11 is heated 78 to approximately 400° F. and a relatively thin, continuous, planar co-extruded polymer layer is applied to the sheet metal 11. As best shown in FIG. 10, the co-extruded polymer layer is preferably formed having a thickness of approximately 10 mils. and is formed having a lower laminant layer 81 an upper laminant layer 82. In the preferred embodiment, the lower laminant layer 81 is formed of an ethylene acrylic acid which comprises an adhesive which securely bonds the co-extruded laminant 80 to the sheet metal 11 via direct contact with the sheet metal 11 or contact with the prime coat 76 applied to the sheet metal 11. The upper laminant layer 82 is preferably composed of a polymer-/ethylene acrylic acid blend having a concentration of between 70% and 98% ethylene acrylic acid and 2% to 30% polymer such as an olefin which crosslinks with the polyethylene liner to be later applied to the sheet 11. As will be explained in more detail infra, the co-extruded layer 80 therefore provides a lower adhesive layer 81 adapted to securely bond the co-extruded layer 80 to the sheet metal 11 and an upper polymer containing layer 82 which serves as a base material to allow thermal bonding of a subsequent polymer to the upper layer 82 of the co-extruded layer 80. Although not be way of limitation, in the preferred embodiment, the co-extruded layer 80 comprises a polymer co-extruded layer such as that manufactured by Dow Chemical Company under the trademark PRIMACORE D.A.F. 624.

In the preferred embodiment, the co-extruded polymer layer 80 is applied to the sheet metal 11 at an elevated temperature of approximately 400° F. and is pressed tightly thereupon by way of a conventional roller 83. Subsequently, the sheet metal 11 having the co-extruded polymer layer 80 applied thereto is cooled 84 and subsequently recoiled 85 for later use in the pipe fabrication process. In the preferred embodiment it is contemplated that the pre-treatment process is facilitated on both the upper and lower surfaces of the sheet metal 11 with the lower surface treatment providing additional corrosion protection for the soil side of the resultant pipe. However the lower side may alternatively be coated with conventional films such as epoxy for cosmetic purposes.

Figure 5:
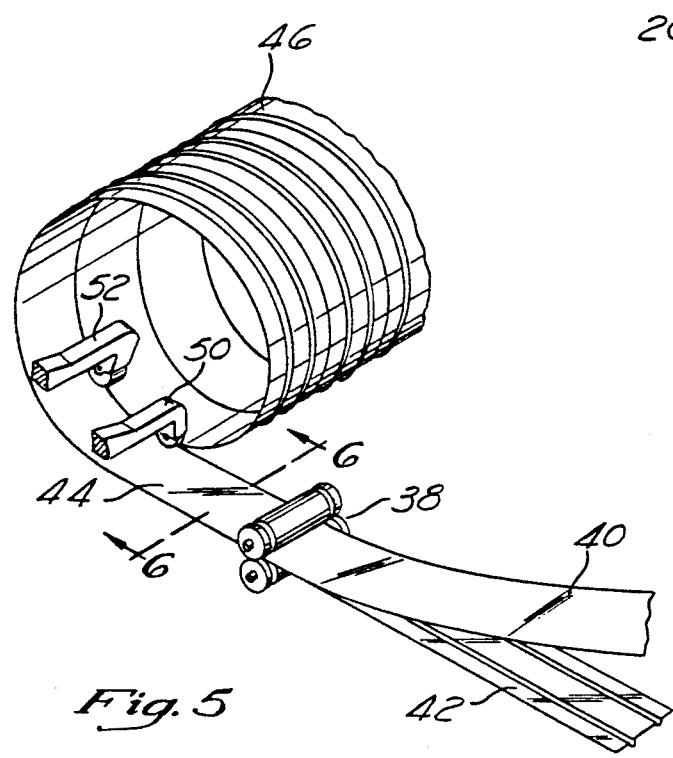
FIG. 5 is an enlarged perspective view of the pipe former of FIG. 4.
Figure 6:
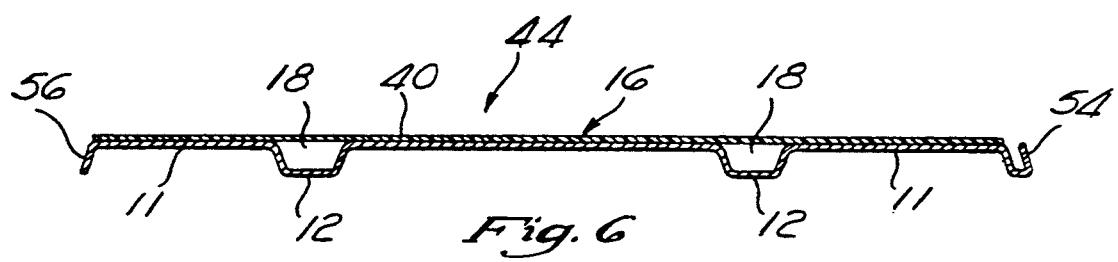
FIG. 6 is an enlarged sectional view of the sheet metal after the ribs have been formed but prior to crimping.

Referring now to FIGS. 4 and 5, the process of forming the metal pipe 10 with integrally formed liner 16 of the present invention is illustrated. As shown, the pretreated sheet metal 11 previously disposed in a coil 30 is mounted upon a conventional uncoiler 20. The uncoiler 20 facilitates the uncoiling of the pre-treated sheet metal 11, having the co-extruded polymer layer 80 disposed upon the upper surface thereof. The pre-treated sheet metal 11 passes through a profile roll former 22 having a plurality of form rolls 32 which progressively form the ribs 12 (as shown in FIG. 1) and edge seam members 54 and 56 (as shown in FIG. 6) within the sheet metal 11. It should be noted that the formation of the ribs 12 comprises the major cold forming procedures for the pipe 10 and is facilitated on the pre-treated sheet metal. As such the substantial tensile and compressive forces exerted in the cold forming process are accommodated by the relatively thin co-extruded polymer layer 80 without cracking and/or blistering. Upon exiting the profile roll former 22, the sheet metal 11 enters a cleaner/heater 24 which prepares the upper surface of the sheet metal 11 for the subsequent thermal bonding of the relatively thick polymer layer, preferably high density polyethylene thereto. Preferably the cleaner/heater 24 elevates the temperature of the sheet metal 11 and the co-extruded polymer layer 80 disposed thereon to approximately 100°-140° F. and not to exceed 180° F. such that the later applied substantially pure polyethylene layer will more readily thermally bond thereto.

A conventional plastic sheet extruder 26 having a screw assembly 34, extruder head 36, and a laminator 38 is preferably utilized to apply a relatively thick layer of polymer, preferably a high density polyethylene to the pre-treated and pre-formed sheet metal 11. As is well known, the screw assembly 34 heats, plasticizes, and supplies a quantity of high density polyethylene to the extruder head 36. The extruder head 36 forms the polyethylene into a continuous planar layer 40 preferably having a thickness of approximately 0.050 to 0.125 of an inch which is applied to the upper surface of the co-extruded polymer layer 80 disposed upon the sheet steel 11. In the preferred embodiment the polyethylene layer 40 is extruded unto the co-extruded polymer layer 80 at a temperature approximately 400° F. A laminator roller preferably comprising a chilled roller 38 subsequently presses the hot extrudate polyethylene layer 40 into contact with the co-extruded polymer layer 80 and the formed and cleaned sheet metal 11. Due to the high density polyethylene layer 40 being applied to the upper surface of the pre-treated sheet metal 11 at an elevated plasticized temperature, a strong thermal bond is facilitated between the high density polyethylene layer 40 and the polymer constituent existing in the upper layer 82 of the co-extruded polymer layer 80 disposed upon the sheet metal 11. As such, a polymer to polymer thermal bond is achieved which securely affixes the high density polyethylene layer 40 to the pre-treated and pre-formed sheet metal 11. The resulting laminated sheet metal 11 may then be further cooled with blown air or water prior to being formed into a helical pipe section 46.

After application of the high density polyethylene layer 40 to the pre-treated sheet metal 11, the resultant metal/polyethylene laminate possesses a cross sectional configuration depicted in FIG. 6. As shown, the high density polyethylene layer 40 extends in a thermally bonded generally contiguous orientation over the upper surface of the sheet metal 11 and preferably overlaps the female edge seam 54 and male edge seam 56 formed on opposite edges of the sheet metal 11. Additionally, to facilitate superior hydraulics for the resultant pipe 10, the layer 40 preferably bridges over the channel formed by the rib 12 of the sheet metal 11 forming voids 18 rendering a generally planar configuration to the high density polyethylene layer 40. Those skilled in the art however will recognize that the layer 40 may alternatively be pressed into the voids 18 to be generally contiguous with the rigs 12 or alternatively the voids 18 may be filled with a polymer material if desired during the lamination process.

Figure 7:
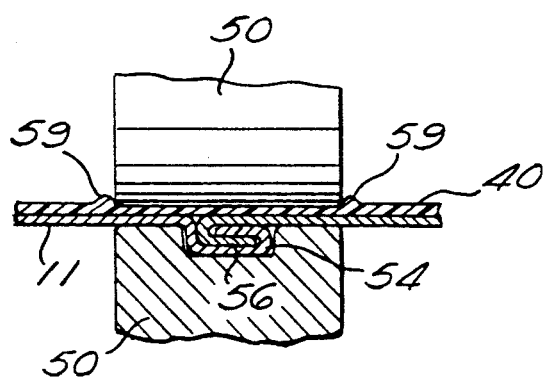
FIG. 7 is a sectional view depicting the crimping lock seam process.

Subsequently, the thermally bonded metal/polyethylene sheet 44 is passed into a crimp/forming roller 50 which helically winds and crimps the male and female edge seams 56 and 54 into a lock seam which forms the resultant pipe length 46. The action of the crimping/forming roller 50 is depicted in FIG. 7. As shown in FIG. 7, the crimping/forming rollers 50 crimps adjacent edge seam members 56 of laminated sheet metal 44 together by forcing male seam member 56 into the female seam member 54 of an adjacent turn as the sheet steel 44 is rolled helically and then bending both male 56 and female 54 seam members into laminar juxtaposition with the adjacent laminated steel sheet 11.

The crimping action of crimping/forming rollers 50 causes the high density polyethylene laminate 40 to be moderately displaced i.e. migrate away from the crimped edge seams 56 and 54, thereby pooling i.e. forming displaced polymer portions 59 adjacent the lock seam.

Figure 8:
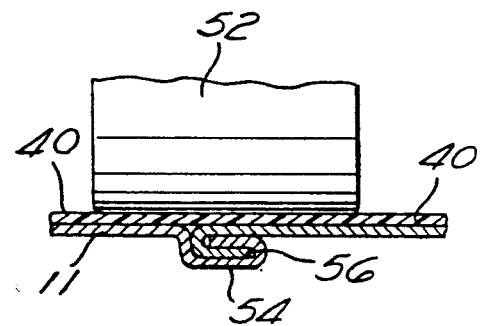
FIG. 8 is a sectional side view depicting the blending of the liner over the crimped look seam.

So as not to affect the hydraulic efficiency of the interior of the pipe 10, in the preferred embodiment, an additional roller 52 is provided which extends outwardly beyond the lock seam formed by the crimped edge seams 56 and 54 which causes the displaced polymer portions 59 to be blended over forming a generally smooth configuration to the polymer 40 as shown in FIG. 8. Subsequently, the polymer layer 40 may be cooled and subsequently cut to desired lengths via a conventional band saw, abrasive wheel, plazma, or laser pipe cutter 48.

As will be recognized the resultant pipe section 46 has substantial structural strength typical of conventional spiral ribbed metal pipe. Further, as shown in FIG. 10, the pipe 10 includes an integrally formed substantially pure high density polyethylene liner 16 having sufficient thickness (i.e. approximately 0.100 of an inch) which is capable of withstanding corrosion caused by contaminant acids encountered in sewer applications. Additionally, since the high density polyethylene liner 16 is applied integrally to the pipe during the fabrication process and thermally bonded to the co-extruded polymer layer 80 adhered to the steel pipe 11, delamination, blistering or cracking of the high density polyethylene layer 16 is eliminated. Further upon installation of the pipe 10 in sewer applications, adjacent pipe sections may be easily abutted and joined at their interfaces by utilizing high density polyethylene wraps which may be thermally welded/bonded to the high density polyethylene liner affixed to the interior of the pipe.

As an additional embodiment of the present invention, it is contemplated that the application of the relatively thick polyethylene layer 40 may be applied to the pre-formed and pre-treated sheet metal 42 subsequent to all structural metal forming operations for the pipe 10. This additional embodiment is illustrated by the phantom lines in FIG. 3 wherein the sheet extruder and laminator 26 and subsequent cooling step is depicted in phantom lines and positioned after the seam roller and pipe formers steps 30. The processes for applying the high density polyethylene layer after all pipe forming procedures have been completed is identical to that disclosed hereabove and has the additional advantage of avoiding any displacement of the high density polymer layer 40 due to the metal fabrication process.

Referring now to FIGS. 11a through 18, the relatively thick layer of high density polymer may be further secured to the sheet metal substrate by capturing a preformed anchor within a tapered channel formed in the metal substrate and attached to the layer of high density polymer. The anchor is preferably comprised of a polymer material such as high density polyethylene and may alternatively be comprised of a high density polyethylene core substantially covered by linear low density polyethylene. Alternatively, the anchor may comprise a substantially hollow core such that it is compressible and may therefore be more easily inserted through the narrow opening of the tapered channel. The anchor is generally disposed within the tapered channel after the co-extruded layer has been applied and the channel has been completely formed.

Figure 11A:
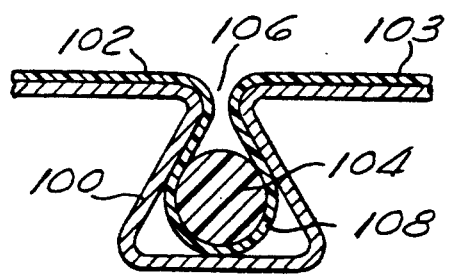
FIG. 11a is a cross sectional side view of a tapered channel having a solid anchor comprised of a single material disposed therein wherein the relatively thick, high density polyethylene layer has been forced into the tapered channel along with the anchor.

With particular reference to FIG. 11a a round anchor 104 is captured within a tapered channel 100. The anchor 104 is comprised of a compressible material and has been forced through the narrow opening 106 of the tapered channel 100 after the relatively thick, high density polyethylene layer 102 has been applied to the sheet metal surface 103. Thus, a portion 108 of the high density polyethylene layer 102 has likewise been forced into the tapered channel 100 and is captured therein by the anchor 104. In this manner, the high density polyethylene layer 102 has been further secured to the sheet metal surface 103 to mitigate the probability of delamination or blistering.

Figure 11B:
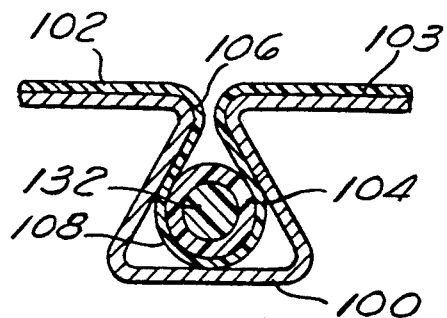

With particular reference to FIG. 11b, the anchor 104 may alternatively be comprised of a high density polyethylene inner core 132 surrounded by a linear low density polyethylene covering 134. The linear low density polyethylene outer covering is comparatively more compressible than the high density polyethylene inner core 132, thereby facilitating compression of the anchor 104 during its insertion through the narrow opening 106 of the tapered channel 100.

Figure 11C:
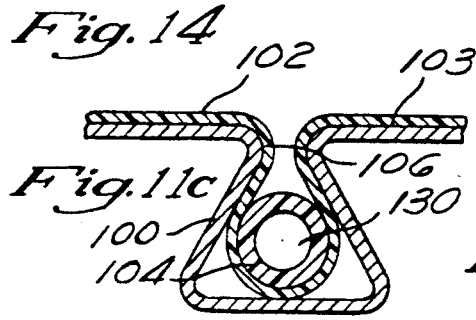

With particular reference to FIG. 11c, the anchor 104 may alternatively comprise a void or hollow core 130 to facilitate compression thereof during the insertion process.

Figure 12:
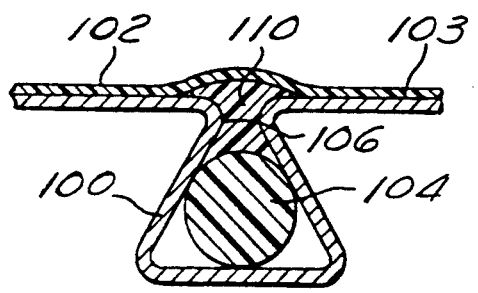
FIG. 12 is a cross sectional side view of a tapered channel having an anchor disposed therein wherein the anchor has been bonded to the relatively thick high density polyethylene layer.

With particular reference to FIG. 12, the anchor 104 may be inserted into the tapered channel 100 prior to application of the relatively thick high density polyethylene layer 102 to the sheet metal surface 103. The high density polyethylene layer 102 may subsequently be welded or adhesively bonded to the anchor 104 forming a bond region 110. Those skilled in the art will recognize that various welding, e.g. thermal or ultrasonic, processes are suitable and that various means of adhesively bonding the anchor 104 to the high density polyethylene layer 102 are likewise suitable. The use of adhesive bonding requires application of the bonding material to the anchor 104 prior to application of the relatively thick high density polyethylene layer 102 to the steel surface 103. Attachment of the high density polyethylene layer 102 to the anchor 104 .thus further secures the high density polyethylene layer 102 in place.

Figure 13:
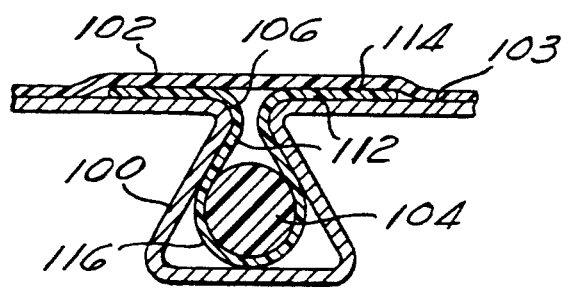
FIG. 13 is a cross sectional side view of a tapered channel having an anchor disposed therein and having a polymer layer substantially surrounding the anchor and extending from the opening of the tapered channel such that the relatively thick high density polyethylene layer is bonded thereto.

With particular reference to FIG. 13, the anchor 104 may be formed to have a film 112 of polymer, preferably polyethylene, substantially surrounding its surface such that the anchor 104 and the surrounding portion of polyethylene film 112 may be inserted into the tapered channel 100 and a portion 114 of the polymer film 112 may extend through the narrow opening 106 of the tapered channel 100 such that the external portion 114 of the polyethylene film 112 may be bonded to the relatively thick, high density polyethylene layer 102.

Figure 14:
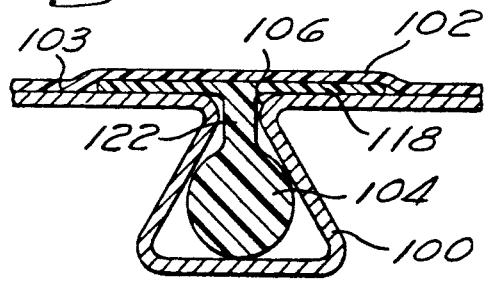
FIG. 14 is a cross sectional side view of a tapered channel having an integral anchor and attachment member wherein the anchor is disposed within the tapered channel and the attachment member extends through the opening thereof such that the relatively thick high density polyethylene layer attaches thereto.

With particular reference to FIG. 14, the anchor 104 may be formed to have an integral external portion 118, preferably connected thereto via a neck portion 122. Thus, the anchor 104 may be forced through the narrow opening 106 of the tapered channel 100 such that the neck portion 122 extends through the narrow opening 106 and the external portion 118 remains disposed outside of the tapered channel 100 such that the high density polyethylene layer 102 may be attached thereto.

Figure 15:
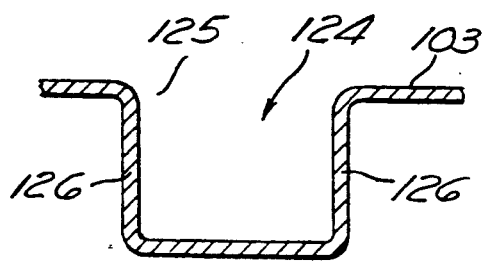
FIG. 15 is a cross sectional side view of a non-tapered channel.
Figure 16:
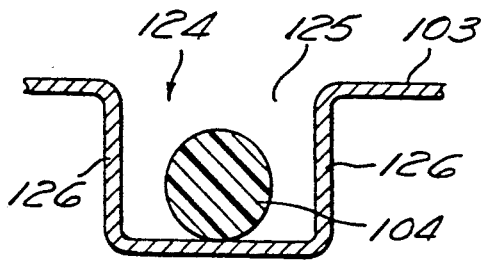
FIG. 16 is a cross sectional side view of a non-tapered channel having an anchor disposed therein.
Figure 17:
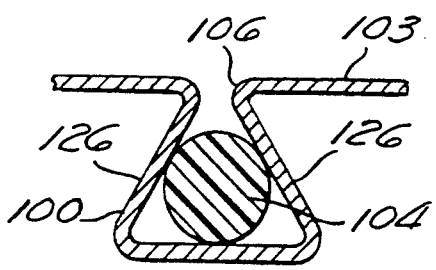
FIG. 17 is a cross sectional side view of the channel and anchor of FIG. 16 after the side walls of the channel have been tapered to capture the anchor therein.

Referring now to FIGS. 15-17, and alternative method of disposing the anchor 104 within a tapered channel is illustrated. Rather than forgoing the anchor 104 through the narrow opening 106 of a preformed tapered channel 100 as illustrated in FIGS. 11a-14, the anchor 104 may be disposed within the tapered channel 100 prior to the complete formation thereof.

With particular reference to FIG. 15, prior to pinching the sides 126 of the tapered channel 100, the channel is initially formed in the cross sectional configuration of a rectangle.

With particular reference to FIG. 16, the anchor 104 is disposed within the rectangular channel 124. The anchor 104 may be easily disposed within the rectangular channel 124 without the need for compressing the anchor 104 because of the large size of the opening 125 of the rectangular channel 124. Thus, a non-compressible anchor may be utilized to mitigate the probability of the core being inadvertently pulled out of the channel.

With particular reference to FIG. 17, subsequent to disposing the anchor 104 within the rectangular channel 124 the sides 126 of the rectangular channel 124 are pinched together such that a narrow opening 106 is formed thereby, thus capturing the anchor 104 within a tapered channel 100. By disposing the anchor 104 within the channel prior to crimping the sides 126 thereof, the step of forcing the anchor 104 through the narrow opening 106 of the tapered channel 100 is eliminated. After being so disposed within the tapered channel 100, the anchor 104 may be bonded to a subsequently applied layer of high density polyethylene as described above.

Figure 18:
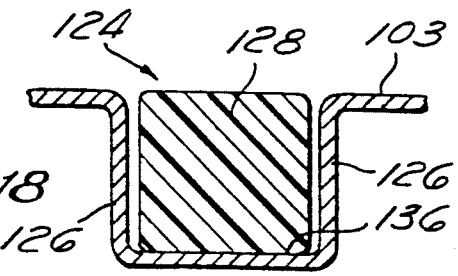
FIG. 18 is a cross sectional side view of a non-tapered channel having a rectangular anchor disposed therein.

Referring now to FIG. 18, an alternative method for capturing an anchor within a channel is illustrated. A rectangular non-tapered channel 124 receives a complementary shaped anchor 128. The anchor 128 is preferably comprised of a linear resilient material which tends to maintain a straight configuration such that when bent it attempts to spring back into a generally straight configuration. The anchor 128 thus tends to push outward against the inner most surface of the bottom 136 of the channel 124 as it attempts to straighten. That is, the anchor 128, when disposed within a channel 124 of a pipe is configured as a helix and attempts to straighten out by pushing outwards against the pipe.

The anchor 128 is disposed within the channel 124 prior to application of the relatively thick high density layer 102 to the sheet metal surface 103. After application of the high density polyethylene layer 102 the high density polyethylene layer is welded or adhesively bonded to the anchor 128 as described above.

It will be understood that the exemplary steel pipe with integrally formed liner described herein and shown in the drawings represents only a presently preferred embodiment of the invention. Indeed, various modifications and additions may be made to such embodiment without departing from the spirit and scope of the invention. For example, various polymer materials having properties similar to high density polyethylene and ethylene acrylic acid may be used. In this regard, in a broad sense, the present invention facilitates the use of a relatively thick polymer liner to be disposed upon a metal surface, which polymer is adhered to the metal surface by way of a co-extruded layer having a lower most adhesive component and an uppermost polymer/adhesive component which enables the subsequent thermal bonding of the relatively thick substantially pure polymer layer via the constituent polymer layer found in the uppermost layer of the co-extruded layer.

Additionally, the present invention contemplates the use of affixing a protective polymer layer to a fabricated product after pre-forming and/or completely forming the fabricated product by pre-treatment of the metal utilized in the fabricated product for subsequent deposition of the polymer layer thereto. Also, various metals and alloys having sufficient structural strength may be utilized as the pipe material.

Furthermore, the polymer laminated metal and method for forming the same need not be limited to the fabrication of pipe, but rather may find application in many diverse areas such as automotive body sheet metal applications and the like. Additionally, the anchors 104 need not be round as described and illustrated, but rather may be of any shape and configuration wherein they may be forced through the narrow opening of the tapered channel and subsequently expand to remain captured therein. Also, the tapered channels 100 need not be generally triangular in shape, but rather may be of any shape and configuration suitable for capturing the anchor therein and compatible with their use in a metal pipe or other sheet metal structure. Thus, these and other modifications and additions may be obvious to those skilled in the art and may be implemented to adapt the present invention for use in a variety of different applications.

What is claimed is:

1. A method for forming polymer laminated metal pipe comprising the steps of:
    (a) providing sheet steel having a co-extruded polymer layer of ethylene acrylic acid and polyethylene/ethylene acrylic acid blend applied upon at least one surface thereof;
    (b) passing said sheet steel through a profile former to form channels and seam members therein;
    (c) disposing a liner of heated polyethylene in laminar juxtaposition to said co-extruded polymer layer of polyethylene/ethylene acrylic acid blend formed upon said sheet steel;
    (d) applying pressure to said layer of polyethylene to cause said layer of polyethylene to thermally bond to said co-extruded polymer layer of polyethylene/ethylene acrylic acid blend, the polyethylene/ethylene acrylic acid blend of the co-extruded polymer layer bonding to the polyethylene of the liner so as to securely attach the liner to the sheet steel; and
    (e) forming said sheet steel into a section of pipe.

2. The method claim 1 further comprising the step of heating at least one of said co-extruded polymer liner of polyethylene/ethylene acrylic acid blend and said layer of polyethylene prior to the step of applying pressure to said layer of polyethylene.

3. The method of claim 1 wherein the step of forming said sheet steel into a pipe section further comprises the steps of:
    (a) passing said sheet steel by a crimp roller to crimp adjacent seam members together as said sheet steel is formed into a helix; and
    (b) passing said sheet steel by a form roller to redistribute the polyethylene over the seam.

4. The method of claim 1 wherein the step of passing said sheet steel through a profile former is performed prior to the step of disposing a liner of heated polyethylene in laminar juxtaposition to said co-extruded polymer layer.

5. The method of claim 1 wherein the step of disposing a liner of heated polyethylene in laminar juxtaposition to said co-extruded polymer layer is performed prior to the step of passing said sheet steel through a profile former.

6. A method for forming polymer laminated metal pipe comprising the steps of:
    (a) providing sheet steel having a co-extruded polymer layer or ethylene acrylic acid and polyethylene/ethylene acrylic acid blend applied on at least one surface thereof;
    (b) passing said sheet steel through a profile former to form tapered channels and seam members therein;
    (c) disposing a liner of heated polyethylene in laminar juxtaposition to said co-extruded polymer layer, said liner of polyethylene substantially covering said tapered channels;
    (d) applying pressure to said liner of polyethylene to cause said layer of polyethylene to thermally bond to said co-extruded polymer layer, the polyethylene/ethylene acrylic acid blend of the co-extruded polymer layer bonding to the polyethylene of the liner so as to securely attach the liner to the sheet steel;
    (e) forming said sheet steel into a section of pipe; and
    (f) urging an anchor through said liner of polyethylene and into said tapered channel such that said liner of polyethylene substantially surrounds said anchor such that said liner of polyethylene is captured within said tapered channel.

7. A method for forming polymer laminated metal pipe comprising the steps of:
    (a) providing sheet steel having a co-extruded polymer layer of ethylene acrylic acid and polyethylene/ethylene acrylic acid blend applied on at least one surface thereof;
    (b) passing said sheet steel through a profile former to form tapered channels and seam members therein;
    (c) disposing an anchor within said at least one of said tapered channels;
    (d) disposing a liner of heated polyethylene in laminar juxtaposition to said co-extruded polymer layer;
    (e) applying pressure to said liner of polyethylene to cause said liner of polyethylene to thermally bond to said co-extruded polymer layer, the polyethylene/ethylene acrylic acid blend of the co-extruded polymer layer bonding to the polyethylene of the liner so as to securely attach the liner to the sheet steel;
    (f) bonding said liner of polyethylene to said anchor; and
    (g) forming said sheet steel into a section of pipe.

8. A method for forming polymer laminated metal pipe comprising the steps of:

(a) providing sheet steel having a co-extruded polymer layer of ethylene acrylic acid and polyethylene/ethylene acrylic acid blend applied on at least one surface thereof;
(b) passing said sheet steel through a profile former to form tapered channels and seam members therein;
(c) disposing an anchor partially within said tapered channel, said anchor comprising a first portion which is disposed within said tapered channel and a second portion which is disposed in laminar juxtaposition to the sheet steel proximate said tapered channel; and
(d) bonding a polyethylene liner having a thickness greater than said co-extruded polymer layer to said co-extruded polymer layer and to the second portion of said anchor, the polyethylene/ethylene acrylic acid blend of the co-extruded polymer layer bonding to the polyethylene of the liner so as to securely attach the liner to the sheet steel;
(e) forming said sheet steel into a section of pipe.

9. The method of claim 8 wherein said second portion of the anchor comprises a film of polymer substantially surrounding the first portion of said anchor and bonded thereto.

10. The method of claim 8 wherein said first and second portions of said anchor are formed as a single integral unit.

11. A method for forming polymer laminated metal pipe comprising the steps of:
(a) providing sheet steel having a co-extruded polymer layer of ethylene acrylic acid and polyethylene/ethylene acrylic acid blend applied on at least one surface thereof;
(b) passing said sheet steel through a profile former to form at least one channel and seam members therein;
(c) disposing an anchor within said at least one channel;
(d) pinching in the upper portion of said at least one channel to form a taper channel to capture said anchor therein;
(e) disposing a liner of heated polyethylene in laminar juxtaposition to said co-extruded polymer layer;
(f) applying pressure to said liner of polyethylene to cause said liner of polyethylene to thermally bond to said co-extruded polymer layer, the polyethylene/ethylene acrylic acid blend of the co-extruded polymer layer bonding to the polyethylene of the liner so as to securely attach the liner to the sheet steel;
(g) bonding said liner of polyethylene to said anchor; and
(h) forming said sheet steel into a section of pipe.

12. The method as recited in claim 11 wherein the steps of thermally bonding a liner of polyethylene to said co-extruded polymer layer and of bonding said polyethylene liner to said anchor are performed simultaneously.

13. A method for forming polymer laminated metal pipe comprising the steps of:
(a) providing sheet steel having a co-extruded polymer layer of ethylene acrylic acid and polyethylene/ethylene acrylic acid blend applied on at least one surface thereof;
(b) passing said sheet steel through a profile former to form tapered channels and seam members therein;
(c) forming said sheet steel into a pipe section such that said channels are configured in a substantially helical configuration;
(d) disposing an anchor within at least one of said channels, said anchor being held within said channel due to the helical configuration of said channel;
(e) disposing a layer of heated polyethylene in laminar juxtaposition to said co-extruded polymer layer;
(f) applying pressure to said liner of polyethylene to cause said liner of polyethylene to thermally bond to said co-extruded polymer layer, the polyethylene/ethylene acrylic acid blend of the co-extruded polymer layer bonding to the polyethylene of the liner so a to securely attach the liner to the sheet steel; and
(g) bonding said liner of polyethylene to said anchor.

14. The method as recited in claim 13 wherein said anchor conforms generally in shape to the shape of said channel.

15. The method as recited in claim 13 wherein both said anchor and said channel are generally rectangular in cross sectional shape.

16. The method as recited in claim 15 wherein said anchor tends to straighten from its helical configuration, the tendency to straighten urging said anchor into said channel and maintaining the position thereof.

* * * * *